(12) United States Patent
Putman et al.

(10) Patent No.: US 10,698,191 B2
(45) Date of Patent: *Jun. 30, 2020

(54) CAMERA AND SPECIMEN ALIGNMENT TO FACILITATE LARGE AREA IMAGING IN MICROSCOPY

(71) Applicant: Nanotronics Imaging, Inc., Cuyahoga Falls, OH (US)

(72) Inventors: Matthew C. Putman, Brooklyn, NY (US); John B. Putman, Celebration, FL (US); Brandon Scott, New York, NY (US); Dylan Fashbaugh, Monmouth Junction, NJ (US)

(73) Assignee: NANOTRONICS IMAGING, INC., Cuyahoga Falls, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/023,219

(22) Filed: Jun. 29, 2018

(65) Prior Publication Data

US 2018/0335614 A1  Nov. 22, 2018

Related U.S. Application Data

(63) Continuation of application No. 15/596,352, filed on May 16, 2017, now Pat. No. 10,048,477.

(60) Provisional application No. 62/457,470, filed on Feb. 10, 2017.

(51) Int. Cl.
| | |
|---|---|
| *G02B 21/00* | (2006.01) |
| *G02B 21/36* | (2006.01) |
| *G06K 9/00* | (2006.01) |
| *H04N 1/387* | (2006.01) |
| *G02B 21/26* | (2006.01) |
| *G06K 9/20* | (2006.01) |

(52) U.S. Cl.
CPC .......... *G02B 21/002* (2013.01); *G02B 21/26* (2013.01); *G02B 21/362* (2013.01); *G02B 21/367* (2013.01); *G06K 9/00134* (2013.01); *H04N 1/3876* (2013.01); *G06K 2009/2045* (2013.01)

(58) Field of Classification Search
CPC .... G02B 21/002; G02B 21/362; G02B 21/26; G02B 21/367; G06K 9/00134; G06K 2009/2045; H04N 1/3876
USPC ......................................................... 348/79
See application file for complete search history.

(56) References Cited

U.S. PATENT DOCUMENTS

| | | | | |
|---|---|---|---|---|
| 2011/0169936 | A1* | 7/2011 | Naiki ..................... | G02B 21/26 348/79 |
| 2013/0077892 | A1* | 3/2013 | Ikeno ................... | G02B 21/367 382/286 |
| 2013/0088586 | A1* | 4/2013 | Sekiya ................... | G02B 21/26 348/79 |

* cited by examiner

*Primary Examiner* — Allen C Wong
(74) *Attorney, Agent, or Firm* — Renner Kenner Greive Bobak Taylor Weber

(57) ABSTRACT

A microscope system and method allow for a desired x'-direction scanning along a specimen to be angularly offset from an x-direction of the XY translation stage, and rotates an image sensor associated with the microscope to place the pixel rows of the image sensor substantially parallel to the desired x'-direction. The angle of offset of the x'-direction relative to the x-direction is determined and the XY translation stage is employed to move the specimen relative to the image sensor to different positions along the desired x'-direction without a substantial shift of the image sensor relative to the specimen in a y'-direction, the y'-direction being orthogonal to the x' direction of the specimen. The movement is based on the angle of offset.

20 Claims, 13 Drawing Sheets

CAMERA AND SPECIMEN ALIGNMENT TO FACILITATE LARGE AREA IMAGING IN MICROSCOPY

FIELD OF THE INVENTION

The present invention generally relates to microscopy imaging techniques. In particular, the present invention relates to apparatus and methods for aligning a camera/image sensor with a specimen so as to precisely scan across the specimen along a desired direction.

BACKGROUND OF THE INVENTION

In microscopy, an area of interest in a specimen to be imaged is often larger than can be displayed by taking a single image with the microscope. Thus scanning techniques are employed to image an entire desired area. In automated scanning, the specimen is moved under the objective lens of the microscope by an XY translation stage so that the microscope can scan across the desired area, with multiple images being collected and then aggregated or stitched to form a single larger image. This stitching can be accomplished using standard software techniques or by ensuring that images are taken at specific locations with very precise stage movement feedback such that, when a first image is taken, the stage moves exactly the distance equal to the width of the first image (and without movement in the height direction) and a second image is taken to them be joined at the common border. If precise enough, the left edge of first image will then exactly mate and compliment the right edge of for the second image.

It is often advantageous to align the camera pixels to a specific orientation relative to the specimen and then scan that specimen in a specific desired direction and in a manner that maintains the desired orientation. For example, components on silicon wafers (e.g., micro electronic devices or patterned films such as through photolithography) are often oriented in rows (x-direction) or columns (y-direction), and it is helpful to align the camera pixel rows parallel to a component row or align the camera pixel columns parallel to a component column to then accurately scan along a desired row or column while maintaining the parallel relationship there between.

In the current state of the art the camera pixel orientation is often manually aligned to the XY travel of the stage by visible observation, which, in light of the size scales typically involved, does not provide a suitable level of accuracy for many imaging needs. The chances of accurately aligning the pixel rows with the x-direction of the stage and the pixel columns with the y-direction of the stage are very low. After this likely inaccurate alignment, the specimen is rotated relative to the stage in an attempt to align the pixel rows of the image sensor with a desired x'-direction for scanning the specimen and/or to align the pixel columns with a desired y'-direction for scanning the specimen. That is, the specimen is rotated relative to the XY translation stage in order to position a desired x' scanning direction of the specimen parallel to the x-direction movement of the stage and/or position a desired y' scanning direction of the specimen parallel to the y-direction movement of the stage (i.e., the x'-direction and x-direction are intended to be the same and the y'-direction and y-direction are intended to be the same). The x-direction of the XY stage and the rows of pixels of the camera having been previously visually aligned (as are, axiomatically, the y-direction of the stage and the columns of pixels), the movement of the stage in the desired x-direction or desired y-direction maintains the desired alignment but only to the extent the manually alignment of the image sensor pixels to the XY travel of the stage is highly accurate and precise.

Returning to the patterned silicon wafer example, a desired x-direction might be a row of micro-circuits with this row being aligned parallel to the x-direction movement of the XY translation stage, and, thus parallel to the rows of pixels of the camera. The row of micro-circuits can thus be scanned simply by moving the XY translation stage in the x-direction, while the parallel relationship between the rows of pixel and the row of microcircuits is maintained, and the image sensor is not shifted in the y'-direction, such that accurate recording and stitching is facilitated.

Thus, accurate results depend upon highly accurate alignment of the camera pixels, the XY travel of the stage, and the desired x' and/or y' scanning directions of the specimen. This is difficult to achieve given normal tolerance in machining and errors inherent in mere visual observation alignment. If even slightly out of alignment, the image sensor will be shifted in the x'-direction and/or y'-direction to an unacceptable degree as the specimen is moved by the translation stage, thus frustrating the ease by which images can be analyzed and/or stitched together. Additionally, it is often desired that a specimen be analyzed with a minimal amount of handling of the specimen. Thus, there is a need in the art for new methods for aligning and scanning that do not rely on specimen movement and ensure accurate alignment between the image sensor and the specimen.

SUMMARY OF THE INVENTION

In a first embodiment, the present invention provides a microscopy method for imaging a specimen along a desired x'-direction of the specimen. The specimen is placed on an XY translation stage and movable by the XY translation stage so as to have a portion of the specimen placed within the field of view of an image sensor. The XY translation stage is movable in an x-direction and a y-direction to move the specimen relative to the image sensor, the image sensor having a multitude of pixels arranged to define pixel rows and pixel columns, the desired x'-direction of the specimen being angularly offset from the x-direction of the XY translation stage so as to define a slope and angle of offset relative thereto, the image sensor viewing only a discrete segment of the specimen at a time. The method comprises the steps of: rotating the image sensor such that the pixel rows are substantially parallel with the desired x'-direction of the specimen; determining the angle of offset of the desired x'-direction as compared to the x-direction of the XY translation stage; establishing a first position for the specimen relative to the image sensor as rotated in said step of rotating, said first position placing at least a portion of the specimen within the field of view of the image sensor; and, after said step of determining and said step of establishing, moving the specimen with the XY translation stage to a second position along the desired x'-direction, wherein the second position places at least a second portion of the specimen within the field of view of the image sensor, and the second position is not substantially shifted in a y'-direction of the specimen, the y'-direction being orthogonal to the x'-direction of the specimen, wherein said step of moving is based upon the angle of offset determined in said step of determining.

In a second embodiment, the present invention provides a microscopy method as in any of the embodiments above, wherein said step of determining an angle of offset includes:

measuring the x distance and y distance between a first focal feature and a second focal feature aligned along and thus defining the desired x'-direction, the x distance and y distance being measured relative to the x-direction and y-directions of the translation stage.

In a third embodiment, the present invention provides a microscopy method as in any of the embodiments above, wherein said step of measuring the x distance and y distance includes: placing the first focal feature so as to overlap with one or more target pixels of the image sensor, and thereafter moving the specimen to place the second focal feature so as to overlap with the same one or more target pixels, said step of measuring the x distance and y distance being the magnitude of x and y movement of the translation stage ($\Delta X$, $\Delta Y$) necessary to achieve said step of moving the specimen to place the second focal feature so as to overlap with the same one or more target pixels.

In a fourth embodiment, the present invention provides a microscopy method as in any of the embodiments above, wherein said target pixels encompass the center of the image sensor.

In a fifth embodiment, the present invention provides a microscopy method as in any of the embodiments above, wherein said step of rotating the image sensor includes identifying an axis-defining feature on the specimen running in the x'-direction, and using computer vision to align the pixel rows substantially parallel to the detectable direction of the specimen.

In a sixth embodiment, the present invention provides a microscopy method as in any of the embodiments above wherein said step of rotating the image sensor is performed before said step of measuring the x distance and y distance.

In a seventh embodiment, the present invention provides a microscopy method as in any of the embodiments above, wherein said step of rotating the image sensor includes taking a mosaic of images suitable for calculating a reference line between the first focal feature and the second focal feature and using computer vision to align the pixel rows of the image sensor with the reference line.

In an eighth embodiment, the present invention provides a microscopy method as in any of the embodiments above, wherein said step of taking a mosaic of images is carried out while carrying out said step of measuring the x distance and y distance.

In a ninth embodiment, the present invention provides a microscopy method as in any of the embodiments above, wherein, before said step of rotating the image sensor, the method includes the step of aligning the pixel rows substantially parallel to the x-direction of the XY translation stage.

In a tenth embodiment, the present invention provides a microscopy method as in any of the embodiments above, wherein said step of rotating the image sensor includes: identifying an axis-defining feature on the specimen, the axis-defining feature having a detectable shape running in the desired x'-direction; and using computer vision to align the pixel rows substantially parallel to the detectable shape, and said step of determining the angle of offset includes: measuring the degrees of rotation of the image sensor from its position after said step of aligning the pixel rows substantially parallel to the x-direction of the XY translation stage to its position after said step of rotating the image sensor.

In an eleventh embodiment, the present invention provides a microscopy method as in any of the embodiments above, wherein said XY translation stage provides a specimen chuck to hold the specimen, wherein either the specimen chuck or a specimen placed thereon includes a reference mark, and said step of aligning the pixel rows substantially parallel with the x-direction of the XY translation stage includes: placing the reference mark at a first position within in the field of view of the image sensor and taking image data to determine a first pixel row number for the position of the reference mark relative to the pixel rows, moving the specimen chuck along only the x-direction of the XY translation stage to place the reference mark at a second position within the field of view of the image sensor and taking image data to determine a second pixel row number for the position of the reference mark relative to the pixel rows, and, after said steps of placing and moving, rotating the image sensor to place the reference mark at a third position having a third pixel row number that is between said first pixel row number and said second pixel row number.

In a twelfth embodiment, the present invention provides a microscopy method as in any of the embodiments above, wherein, after said step of rotating the image sensor to place the reference mark at a third position, said steps of (i) placing the reference mark at a first position, (ii) moving the specimen chuck along only the x-direction, and (iii) rotating the image sensor to place the mark at a third position are repeated until the pixel rows are substantially parallel with the x-direction of the XY translation stage.

In a thirteenth embodiment, the present invention provides a microscopy method as in any of the embodiments above, wherein said step of determining is carried out after said step of aligning the pixel rows substantially parallel with the x-direction of the XY translation stage.

In a fourteenth embodiment, the present invention provides a microscopy method as in any of the embodiments above, wherein said step of rotating the image sensor includes: identifying an axis-defining feature on the specimen, the axis-defining feature having a detectable shape running in the desired x'-direction; and using computer vision to align the pixel rows substantially parallel to the detectable shape, and said step of determining the angle of offset includes: measuring the degrees of rotation of the image sensor from its position after said step of aligning the pixel rows substantially parallel to the x-direction of the XY translation stage to its position after said step of rotating the image sensor.

In a fifteenth embodiment, the present invention provides a microscopy method as in any of the embodiments above, wherein said step of measuring the degrees of rotation of the image sensor includes obtaining a signal output from an instrument rotating the image sensor.

In a sixteenth embodiment, the present invention provides a microscope system comprising: a microscope; an image sensor recording image data, said image sensor including pixel rows and pixel columns; an XY translation stage; a specimen on said XY translation stage and viewed by said image sensor, wherein the XY translation stage is movable in an x-direction and a y-direction to move the specimen relative to the image sensor, the image sensor having a multitude of pixels arranged to define pixel rows and pixel columns, wherein the specimen presents features along a x'-direction that is angularly offset from the x-direction of the XY translation stage so as to define an angle of offset relative thereto, the specimen further including a first focal feature and a second focal feature, a processor serving to: rotate the image sensor relative to the specimen such that the pixel rows are parallel with the x'-direction of specimen, move the XY translation stage; determine the angle of offset of the x'-direction as compared to the x-direction of the XY translation stage; and scanning across the specimen in the desired x' direction by: establishing a first position for the specimen relative to the image sensor when the pixel rows are parallel with the x'-direction, the first position placing at least a portion of the specimen within the field of view of the image sensor; and, moving the specimen with the XY translation stage to a second position along the desired x'-direction, wherein the second position places at least a second portion of the specimen within the field of view of the image sensor, and the second position is not substantially shifted in a y'-direction of the specimen, the y'-direction being orthogonal to the x'-direction of the specimen, wherein the movement is based upon the angle of offset determined by the processor.

In a seventeenth embodiment, the present invention provides a method for aligning pixel rows of an image sensor with the x-direction of an XY translation stage, wherein said XY translation stage provides a specimen chuck to hold the specimen, the specimen chuck being moved in a x-direction and a y-direction by the XY translation stage, the method comprising the steps of: providing a reference mark on the specimen chuck or on a specimen placed on the specimen chuck; placing the reference mark at a first position within the field of view of the image sensor and taking image data to determine a first pixel row number for the position of the reference mark relative to the pixel rows of the image sensor, moving the specimen chuck along only the x-direction of the XY translation stage to place the reference mark at a second position within the field of view of the image sensor and taking image data to determine a second pixel row number for the position of the reference mark relative to the pixel rows, and, after said steps of placing and moving, rotating the image sensor to place the reference mark at a third position having a third pixel row number that is between said first pixel row number and said second pixel row number; wherein, after said step of rotating the image sensor to place the reference mark at a third position, said steps of (i) placing the reference mark at a first position, (ii) moving the specimen chuck along only the x-direction, and (iii) rotating the image sensor to place the mark at a third position are repeated until the pixel rows are substantially parallel with the x-direction of the XY translation stage.

DETAILED DESCRIPTION OF ILLUSTRATIVE EMBODIMENTS

Contrary to the prior art, the present invention does not seek to align a desired x'-direction with the x-direction of the XY stage, but instead permits a desired x'-direction for scanning across the specimen to be out of alignment with the x-direction of movement of the XY translation stage. The present invention rotates the image sensor to achieve the desired alignment, thereby creating an offset between the XY directions of the translation stage and the pixel rows and columns of the image sensor. The present invention also determines the angle of offset or slope of the desired x'-direction relative to the x-direction of the XY translation stage. With the angle of offset/slope known, and the pixel rows aligned with the desired scanning direction, i.e., the x'-direction, the XY translation stage can be controlled to move the specimen relative to the image sensor to different positions along the desired x'-direction without a substantial shift of the image sensor relative to the specimen in a y'-direction, the y'-direction being orthogonal to the x' direction of the specimen.

The present invention also provides a method to accurately and precisely align the pixel rows of an image sensor with the x-direction of the XY translation stage. This alignment then leads to a method for determining the angle of offset/slope of a desired x'-direction of a specimen relative to the x-direction of the XY translation stage.

The general processes of the present invention are disclosed in various embodiments herein and, once the general physical conditions of the process are established, the process can be carried out in an automated manner with an appropriately configured microscopy system and related computer processing and microscopy techniques such as computer vision, motion control and measurement, and the like. As used herein "computer vision" is to be understood as covering algorithms for image processing, pattern recognition, computer vision or other known techniques for image analysis. First, aspects of the general microscope apparatus are disclosed, with methods of the present invention being disclosed thereafter.

Figure 1A:
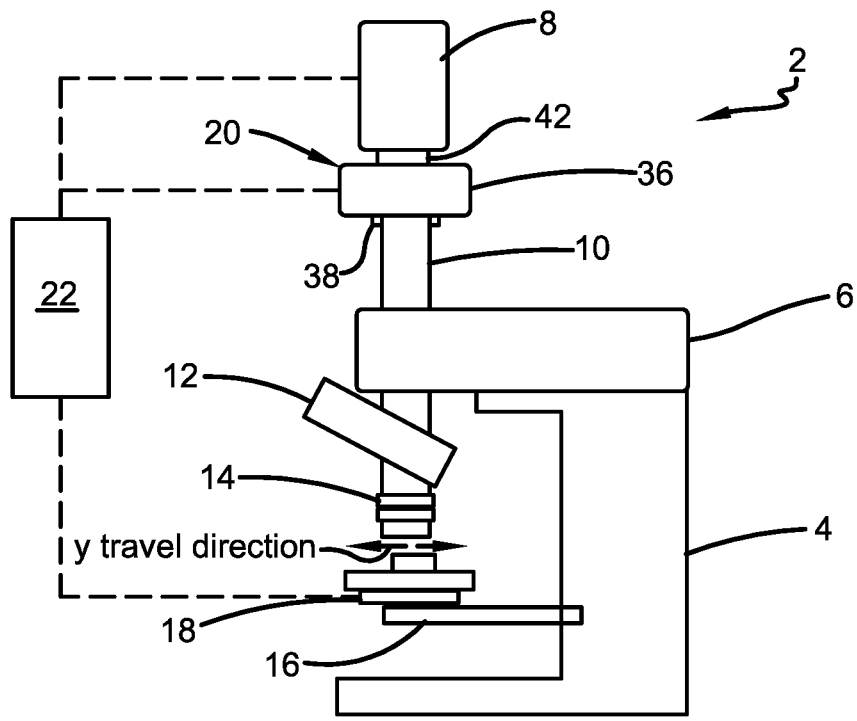
FIG. 1A is a schematic side view of a microscope system in accordance with this invention.
Figure 1B:
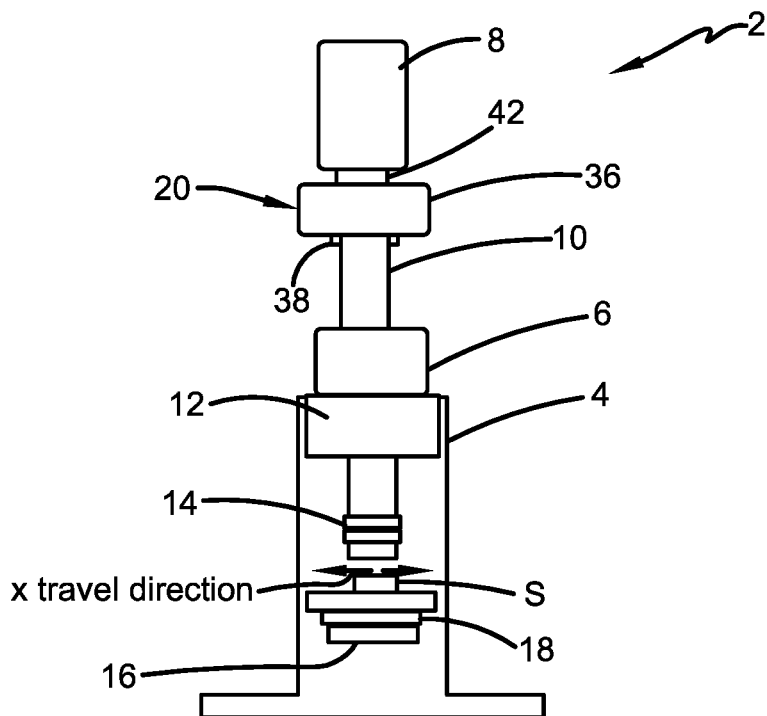
FIG. 1B a schematic front view of FIG. 1.

FIGS. 1A and 1B show an embodiment of a reflected light microscope system 2 as an example of the present invention, noting that the invention is equally applicable to other types of microscopes such as transmitted light microscopes, inverted microscopes, electron microscopes and others. Standard parts of the typical microscope system 2 include a stand 4, a vertical illuminator 6, a camera 8, a lens tube 10, a nosepiece 12, an objective lens 14, a z-axis focus arm 16 and an XY translation stage 18. These components are well known to those familiar with the art. A camera rotator 20 works together with the XY translation stage 18 to achieve unique methods of scanning and/or imaging in accordance with this invention.

XY translation stages are well known in the art. They can be driven by stepper, servo, or linear motors, among others. The configuration of an XY translation stage is typically that of affixing one single axis stage to the z-axis focus arm 16 and affixing a second single axis stage to the first stage with axis of translation being 90 degrees to each other, though minor errors in orthogonal alignment of the X and Y stage are experienced in practice. Orthogonal alignment is a generally known term and addresses the fact that, for the two stages to travel precisely along the x and y axes, the line of travel for the y-axis must be orthogonal to the line of travel of the x-axis. If the two travel lines are not orthogonal, x-axis travel creates a position error in the y-direction. An orthogonality error can be expressed as the degrees of offset between the theoretical x-axis direction and the direction of empirical x-axis travel in light of the position error that occurs in the y-direction. It can also be expressed as a y position offset per x-direction travel length (e.g., 10 micron y position shift per 400 mm x-direction travel).

Figure 2A:
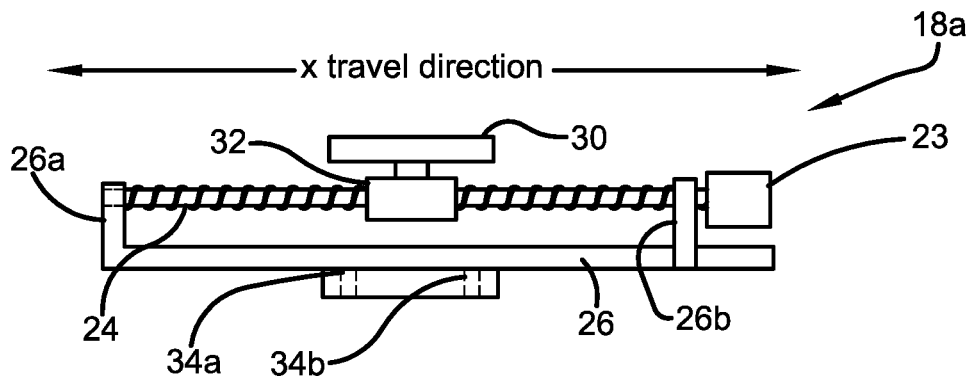
FIG. 2A is a schematic side view of a single axis translation stage.
Figure 2B:
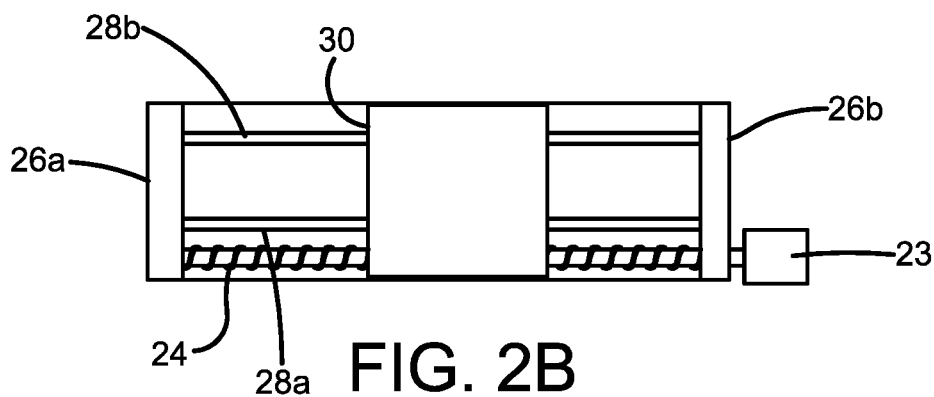
FIG. 2B is a schematic top plan view of the translation stage of FIG. 2A
Figure 2C:
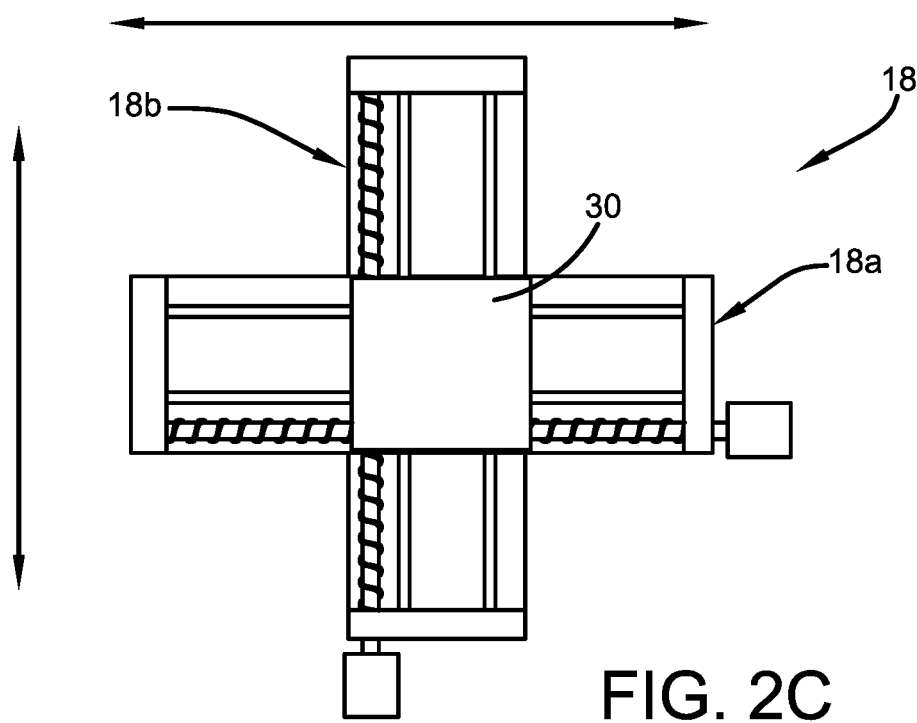
FIG. 2C is a schematic top plan view of an XY translation stage formed of two single axis translation stages

FIGS. 2A, 2B, and 2C provide an example of a typical configuration of an XY translation stage. FIG. 2A represents the front view of a single axis stage 18a comprising a drive motor 23, a drive screw 24, and a stand 26 with cushion blocks 26a and 26b. The cushion blocks 26a and 26b contain bearings and retainers (not shown) to support the drive screw 24, which is attached to the drive motor 23 by a coupling (not shown). FIG. 2B is a top down view of the single axis stage 18a. In this embodiment, guide rods 28a and 28b are present to provide stability and guidance to the travel of specimen chuck 30. The specimen chuck 30 contains a linear bearing (not shown) through which the guide rods travel, and a ball nut 32 that propels the chuck 30 along the drive screw 24 depending upon the direction of rotation of the drive screw 24. The stand 26 is provided with mounting holes 34a and 34b to attach to the z-axis focus arm. A first single axis stage 18a and a second single axis stage 18b can be joined to create an XY translation stage as generally known in the art and shown in FIG. 2C, wherein stage 18b holds stage 18a, which holds the specimen chuck 30.

This particular XY translation stage is provided as an example only, and it will be appreciated that other configurations of XY translations stages existing or hereafter created may be found useful in the present invention. As will be appreciated from the disclosure herein, it is only necessary that a translation stage used for the present invention be capable of allowing for precise control of the XY stage and providing precise position information of the X and Y stages. For example, in translation stages utilizing screw drives, feedback may be in the form of rotary encoders providing a signal that is directly proportional to the distance traveled. In other translation stages, a linear encoder may be used to provide direct feedback of the position of the stage.

Figure 3A:
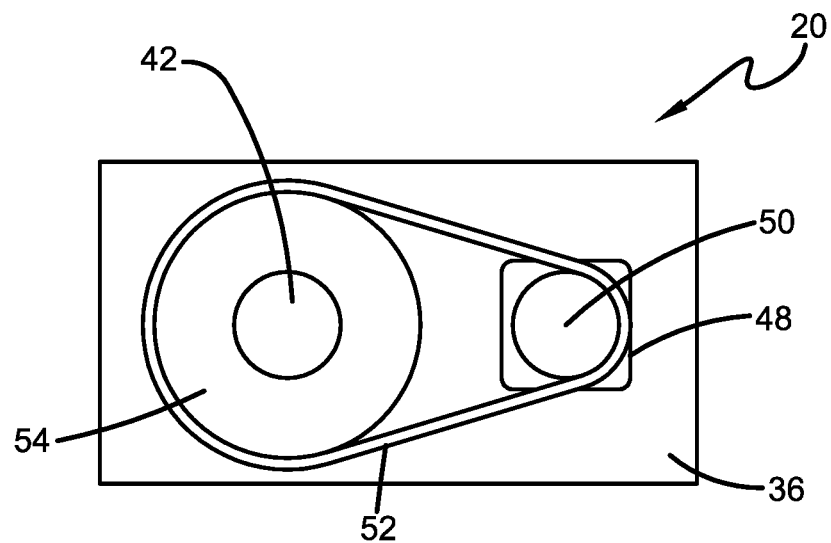
FIG. 3A is a schematic top plan view of a camera rotator useful in an embodiment of this invention.
Figure 3B:
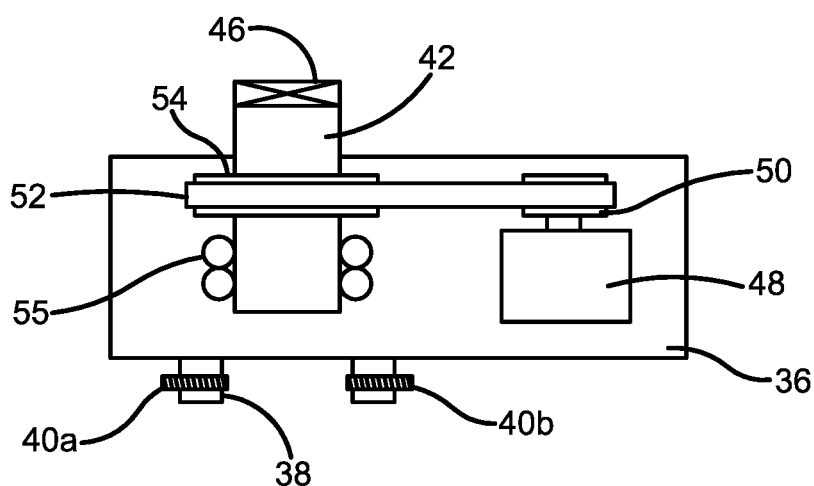
FIG. 3B is a schematic side view of the camera rotator of FIG. 3A.

FIGS. 3A and 3B provide more details of a camera rotator 20, such as that shown in FIG. 1A. It should be noted that this configuration is shown for example only and that other configurations resulting in the rotation of the camera with respect to the XY stage are possible. Here a rotator housing 36 is provided with flange 38 so that it may be attached to lens tube 10 and held in place by locking screws 40a and 40b. A rotational camera mount 42 is held in the housing 36 and free to rotate within bearings 55. A connector 46 serves to attach the camera 8 to the camera mount 42. A drive motor 48 together with a pulley 50, a drive belt 52 and camera rotator pulley 54 provide means to rotate the camera 8. A rotary encoder, potentiometer, stepper motor control or other similar device can be used so that the angular rotation a is known. These would provide a signal output (for example to processor 22) that is proportional to the degree of rotation, such that a highly accurate angle of offset is determined from that signal. In some embodiments, a rotary encoder is provided within the motor assembly to provide the exact degree of rotation of the camera.

It should be appreciated that all adjustable parts of the microscope can be controlled by additional appropriate hardware and one or more processors. A processor 22 is shown here as controlling the camera rotator 20, the camera 8, and the XY translation stage 18 (and the z-axis focus arm 16), and appropriate hardware and software is implicated and generally denoted by processor 22. It will be appreciated that multiple processors could be employed, and the same in encompassed by the simple use of processor 22 in the Figures. Other aspects of the microscope system 2 can also be so controlled. The software is programmed to control X, Y and Z movement of the XY translation stage 18, as well as rotation of the camera 8 and the activation of the camera to record image data through the image sensor 56. Focusing can be automated by known methods as well. As is known in the art, the stage travel can be precisely known and controlled with rotary or linear encoders. The camera rotation can be precisely known by rotary encoders, potentiometers, stepper motor control or other. These precise positioning devices are used to provide input to software assisting in carrying out the invention. A computer, programmable controller or other processor, such as processor 22, is employed to analyze the inputs and provide control output to the stage and rotator.

The camera 8 may contain an image sensor 56 (such as a CCD or CMOS sensor) used to capture images (or image data) of a specimen S. As used herein, an "image" does not require the actual production of an image viewable by an observer, and it simply requires the taking of digital data that can be used to create the desired image. Thus "image" and "image data" are used herein without significant distinction.

Figure 4:
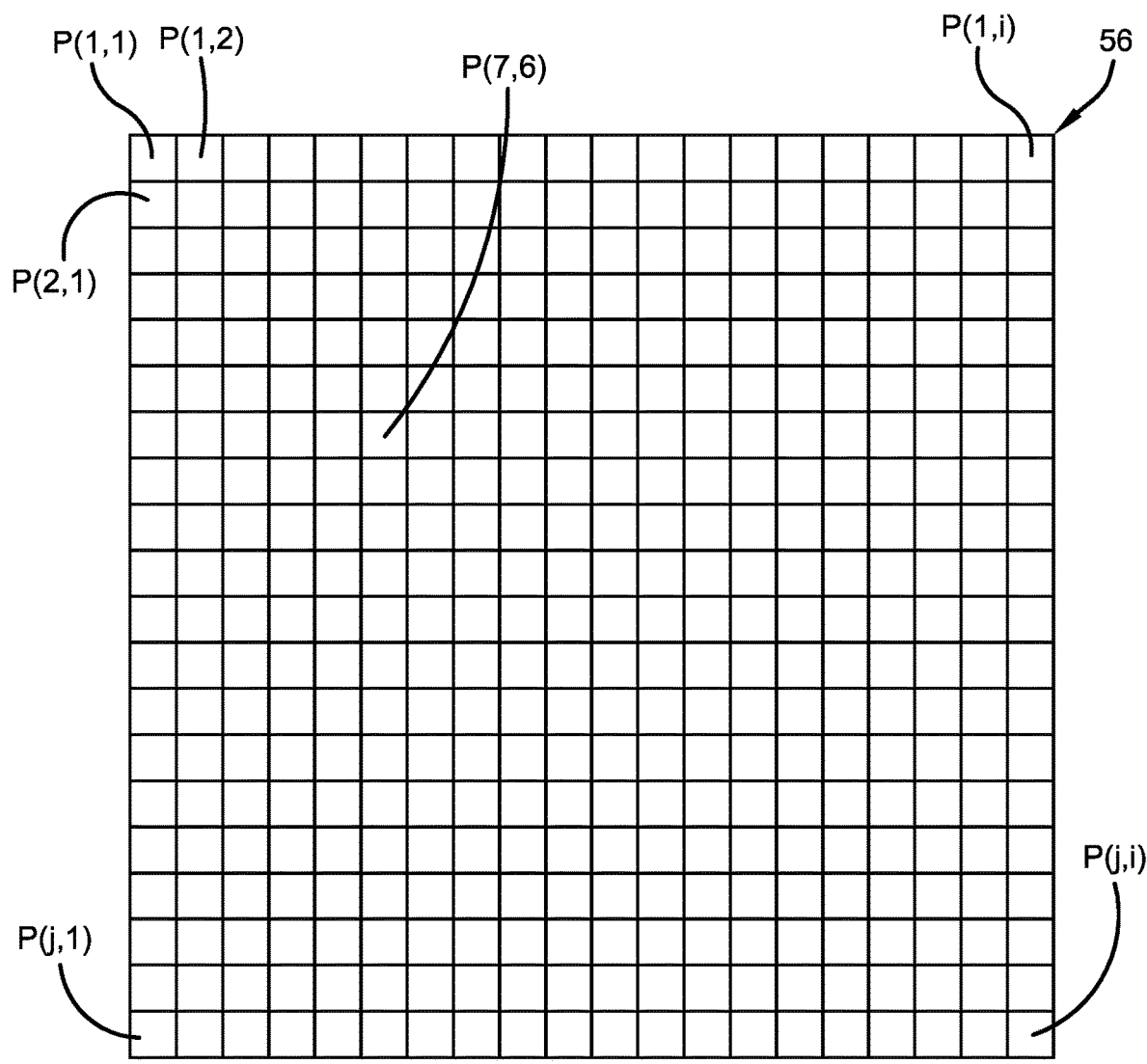
FIG. 4 is a schematic representation of pixels of an image sensor.

An image sensor is comprised of pixels. A typical sensor may have between 0.6 and 10 megapixels or more. The size of the pixels vary and are typically between 3 and 10 micrometers (um) and a typical sensor size may be between less than 25 square mm to greater than 800 square mm. A representation of the image sensor 56 is shown in FIG. 4. It is important to realize that the image sensor's field of view is a function of the magnification of the microscope objective lens 14. An image sensor that is 10×12 mm will have a field of view that is 0.10×0.12 mm at 100× magnification. It can be appreciated that the magnified field of view is much smaller than the specimen to be examined.

As mentioned, the process carried out includes two major steps, a step of rotating the image sensor such that the pixel rows of the image sensor are substantially parallel with the desired x'-direction (i.e., the desired scanning direction) of the specimen, and a step of determining the angle of offset of the desired x'-direction as compared to the x-direction of the XY translation stage. In different embodiments herein, sometimes these steps are separate and distinct, and sometimes they overlap. In accordance with one embodiment, a process for aligning the pixel rows of the image sensor with the X-direction of the XY translation stage is first practiced to provide an accurate reference position of the image sensor prior to rotating it to have pixel rows aligned with the x'-direction of the specimen.

With the pixel rows substantially parallel to the x'-direction, and with the angle of offset known, advantageous scanning across the specimen can be achieved by establishing a first position for the specimen relative to the image sensor, the first position placing at least a portion of the specimen within the field of view of the image sensor; and moving the specimen with the XY translation stage to a second position along the desired x'-direction, wherein the second position places at least a second portion of the specimen within the field of view of the image sensor, and the second position is not substantially shifted in a y'-direction of the specimen, the y'-direction being orthogonal to the x'-direction of the specimen. In the step of moving, the movement is based upon the angle of offset determined in said step of determining.

In some embodiments, it is precise to state that an angle of offset is employed, but it will be appreciated that a slope of the desired x'-direction as compared to the x'-direction of the XY translation stage could instead be employed, and, for purposes herein the "angle of offset" can be expressed or conceptualized as either a slope (m) or an angle (degrees), the angle of a line of slope m relative to a base line being tan−1(m). That is, knowing slope, the angle can be calculated, and vice versa.

A first embodiment of the invention is described with reference to FIGS. 5-8, wherein relevant portions of a microscope system 2 are shown and help explain the general scanning conditions being addressed by the present embodiment. A specimen S is positioned on a specimen chuck 30 positioned in proximity of an image sensor 56 of camera 8. The image sensor 56 is in a fixed position rotatable about its center axis so that the XY translation stage 18, represented by the guide rods, and the specimen S, is moveable to position the specimen S under the image sensor 56. In some embodiments, the camera 8 and image sensor 56 are part of a microscope, and it will be appreciated that the image sensor 56 can be employed to record image data reaching the image sensor 56 through the objective lens 14 and other well-known microscope components. Those of ordinary skill in the art do not require further disclosures beyond the schematics presented here in order to appreciate how the use of microscopes are implicated.

In this particular example of FIGS. 5-8, it is desired to scan the specimen S along a desired x'-direction of the specimen. Notably, the desired x'-direction of the specimen is angularly offset from the x and y movement directions of specimen chuck 30 (as represented by the x and y arrows), and, therefore, the desired x'-direction defines a slope relative to the x- and y-directions of the stage 18. In this example the direction of x' travel is indicated by the line drawn between alignment mark 60 and alignment mark 62. For purposes of disclosure, the angle of offset is shown to be quite significant, and it can be, but it should also be appreciated that the present invention will often be employed where the angle of offset is very small, as angles of offset of even a tiny fraction of a degree can cause significant problems for scanning and/or stitching images at high magnification.

As seen in FIG. 4, and as generally known in the art, the image sensor 56 includes pixel rows and pixel columns, which are schematically represented as pixel rows P(1,1) to P(j,1) and pixel columns P(1, 1) through P(1, i). As noted in the background, the camera 8 and its image sensor 56 are typically mounted in an attempt to place the pixel rows parallel to the x-direction of the translation stage 18/specimen chuck 30, thus also placing the pixel columns parallel to the y-direction of the translation stage 18 and specimen chuck 30. However due to machining tolerances and limitations in achieving perfect alignment whether through automated or, more typically, visual methods, the rows and columns of the image sensor 56 are usually out of alignment with the x- and y-directions of the translation stage 18. Thus, in this embodiment, the sensor rows and columns are not parallel to either the x' or y' desired direction of scanning.

In contradistinction to the prior art, the present invention rotates the camera 8 and thus the image sensor 56 contained within the camera 8 so as to place the pixel rows in a position parallel with the desired x'-direction of the specimen. In some embodiments, relative rotation can be accomplished by rotating the image sensor, the camera holding the image sensor, or the microscope holding the camera or through any other appropriate manipulation of a component of the system.

Figure 5:
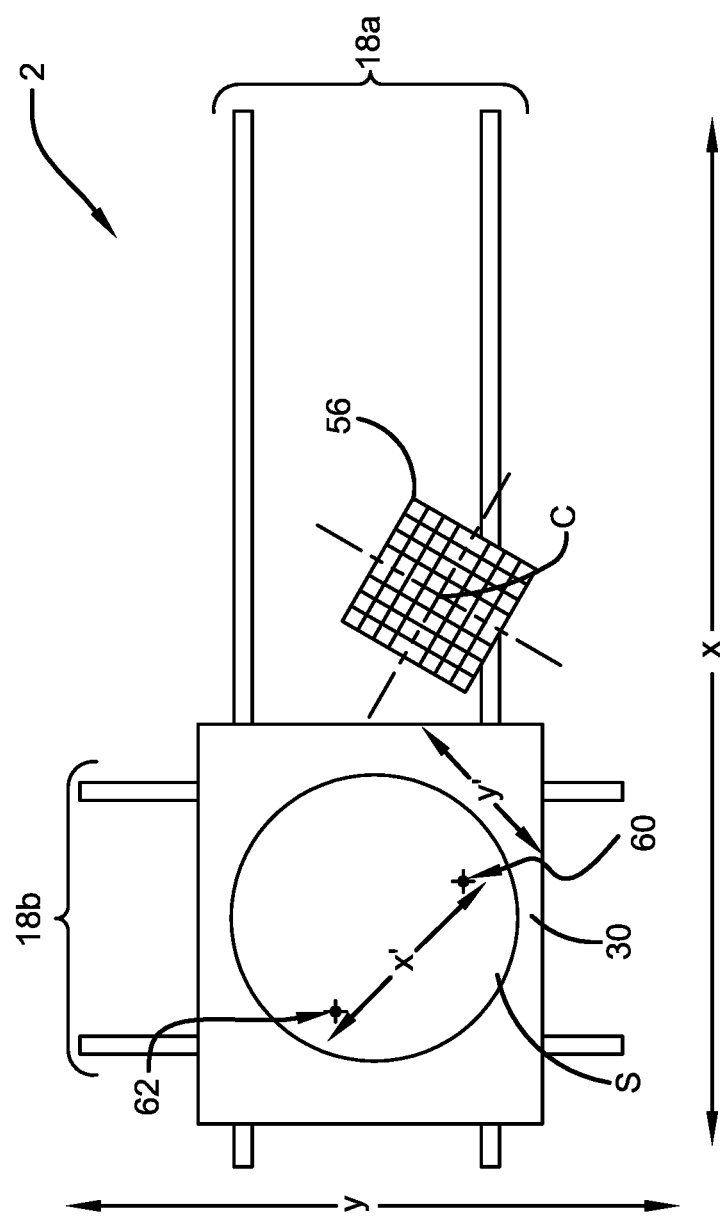
FIG. 5 is a schematic representation of a specimen S on an XY translation stage (18a, 18b) relative to an image sensor 56, showing the general conditions for application of an embodiment of the present invention for determining the angle of offset of a desired x' direction for scanning across the specimen as compared to the x-direction of the XY translation stage.

In the embodiment of FIG. 5, the angle of offset is determined by assessing a slope between two reference marks, herein alignment marks, on the specimen S. The rotation of the image sensor to place pixel rows substantially parallel to the desired x'-direction can be practiced before or after assessing the slope, and various methods for such rotation can be practiced.

Figure 6A:
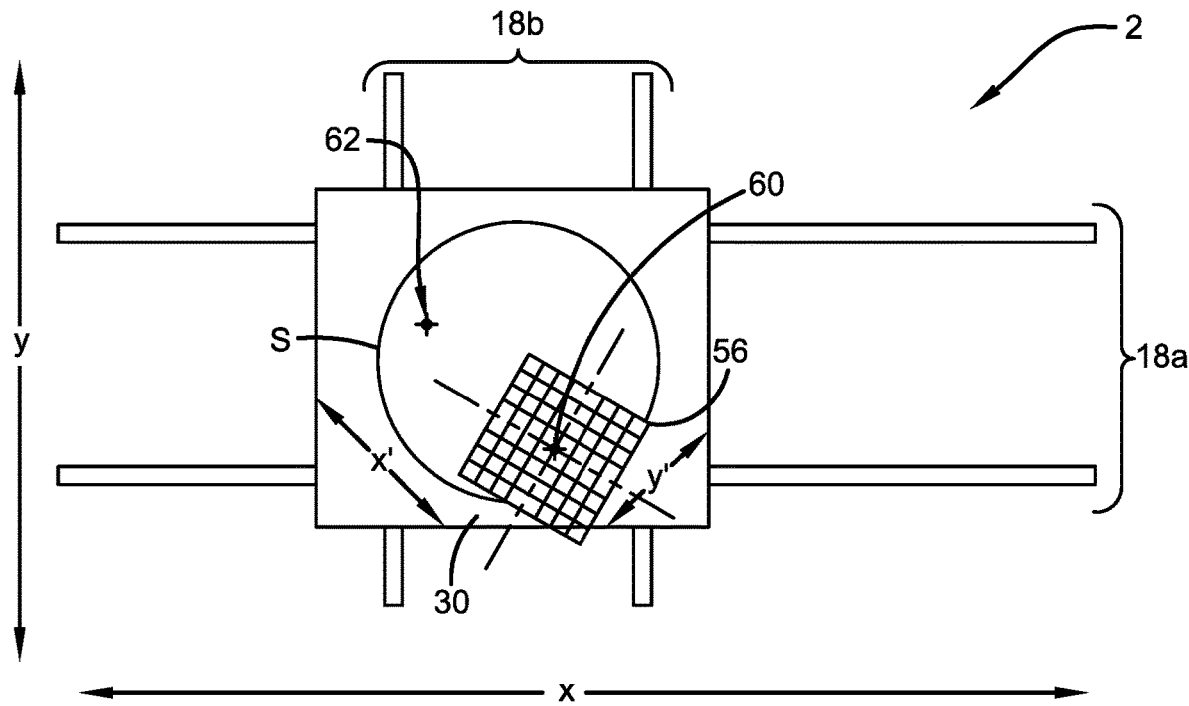
FIG. 6A is a schematic representation of a first step in determining the angle of offset from the general starting conditions of FIG. 5.
Figure 6B:
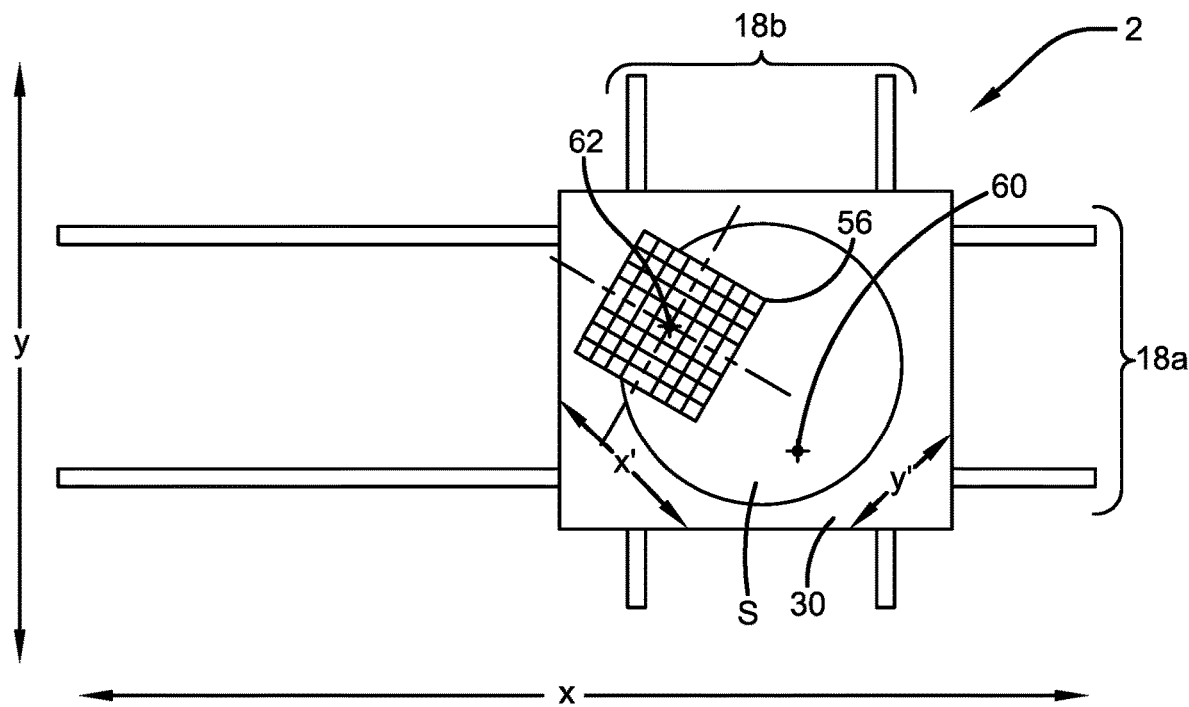
FIG. 6B is a schematic representation of a second step for determining the angle of offset.
Figure 7A:
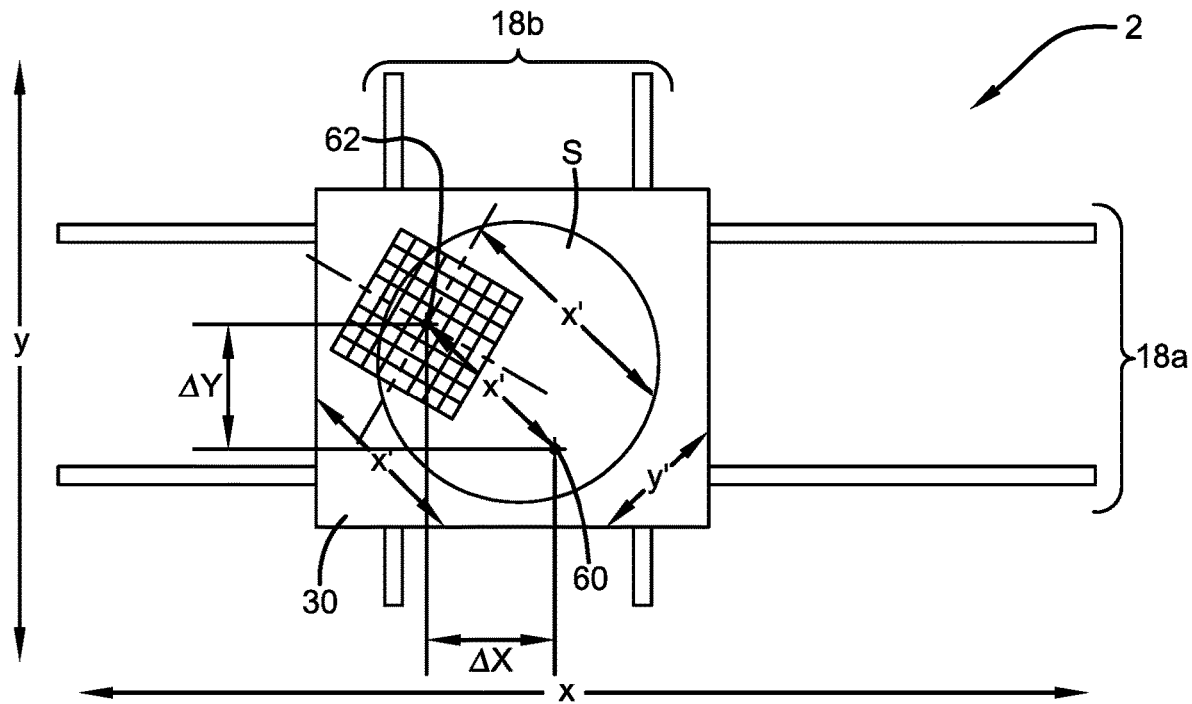
FIG. 7A is a schematic representation of a third step for determining the angle of offset, concluding with the ability to determine the slope ($\Delta X$ and $\Delta Y$) of the x'-direction, and thus its angle of offset.

In FIG. 5, specimen S is seen to have two alignment marks 60 and 62 inscribed. The direction of the line through marks 60 and 62 defines the desired direction of scanning x'. For reference, orthogonal center lines are shown through image sensor 56, and their intersection marks the image sensor center C. FIG. 6A illustrates moving specimen chuck 30 to a position such that alignment mark 60 is positioned in the center of image sensor 56. This movement and positioning is determined using computer vision and standard translation stage motion control. The coordinates of the XY translation stage 18 are recorded and set as the origin for future movements. For example, the processor 22 can record and analyze position and movement data in accordance with the teaching herein. Using computer vision and motion control (e.g., via processor 22) the XY stage 18 is repositioned so that alignment mark 62 is centered in the image sensor 56 as shown in FIG. 6B. The distance to move the stage in the x-direction and y-direction is determined and recorded or otherwise retained for further processing in accordance with the teaching herein. FIG. 7A illustrates this movement and is marked with the change in the x-direction as $\Delta X$ and the change in the y-direction as $\Delta Y$.

Although the alignment marks 60, 62 are focused onto the center C of the image sensor 56 in order to assess $\Delta X$ and $\Delta Y$, it will be appreciated that it is possible to designate any pixel or set of pixels as the target pixel(s) for placing the alignment marks and assessing $\Delta X$ and $\Delta Y$. Thus it is sufficient to place the alignment marks 60 so as to overlap with one or more target pixels of the image sensor 56, and thereafter move the specimen to place the alignment mark 62 so as to overlap with the same one or more target pixels; thereafter assessing the x and y movement to obtain $\Delta X$ and $\Delta Y$.

In some embodiments, the alignment marks are smaller than a pixel, and are thus targeted on a single pixel to assess $\Delta X$ and $\Delta Y$. In other embodiments, the alignment marks encompass multiple pixels. In some embodiments, the alignment marks encompass multiple pixels, and the center of the alignment mark is calculated and used for positioning in a target pixel (such as the center C used in the example). The center can be calculated through computer vision.

Instead of using alignment marks purposefully placed on the specimen, in some embodiments it is possible to employ component features on the specimen S such as micro circuitry components (in some embodiments) or photolithographic features (in other, non-limiting embodiments) that extend in the desired x'-direction. Identifiable component features would be used in the same manner as alignment marks.

Figure 8:
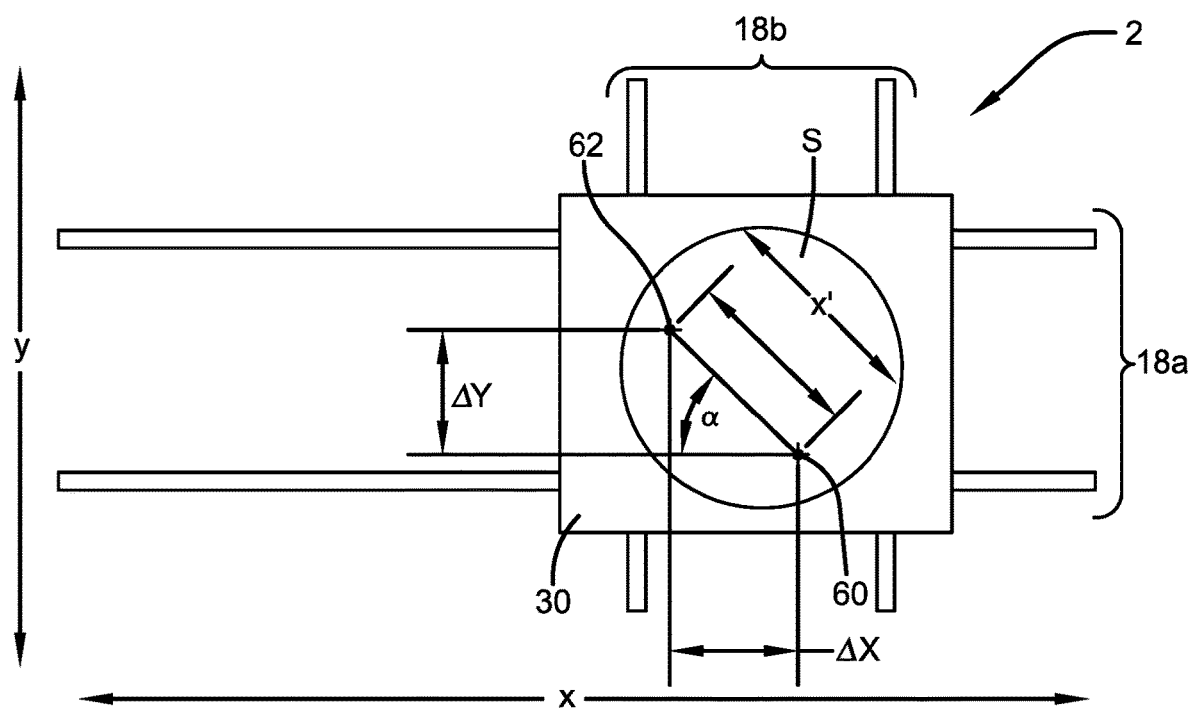
FIG. 8 is a schematic representation of a method for moving a specimen relative the image sensor along a desired x'-direction for a desired d' distance.

Knowing $\Delta X$ and $\Delta Y$ provides the slope (m), which is $\Delta Y/\Delta X$. With the slope, the desired direction of movement x' is defined as compared to the x-direction and y-direction of the XY translation stage. The line defined by slope $\Delta Y/\Delta X$ and going through alignment marks 60, 62 forms an angle a relative to the line extending in the x-direction and extending through the alignment mark 60. Referring to FIG. 8, the angle $\alpha$ can be calculated as tan−1(m). Knowing the angle $\alpha$, any movement in the x'-direction from any point of origin (e.g., a point encompassed by alignment mark 60) can be calculated. For example, in FIG. 8, to move a distance of d' in the x'-direction from the point of origin at alignment mark 60 the specimen chuck can move: $\Delta X=d'(\cos(\alpha))$; $\Delta Y=d'(\sin(\alpha))$. The origin can be set at any location within the plane defined by the maximum travel of the translation stage 18 in the x-direction and the y-direction. It can be appreciated that the same procedures can be used to calculate movement in the y'-direction. It can also be appreciated that other mathematical techniques may be used to calculate travel in the x'- and y'-directions.

Being able to move precisely to different positions along the x'-direction without a substantial shift in the y'-direction allows for accurate scanning in the x'-directions and facilitates accurate stitching of multiple images or image data recorded by the image sensor, particularly when the rows of pixels of the image sensor are substantially parallel to the x'-direction. Thus, in the present embodiment, either before or after determining the slope/angle of offset as noted above, the image sensor is rotated to orient the rows of pixels substantially parallel to the x'-direction, and some methods for doing so are next disclosed.

Figure 7B:
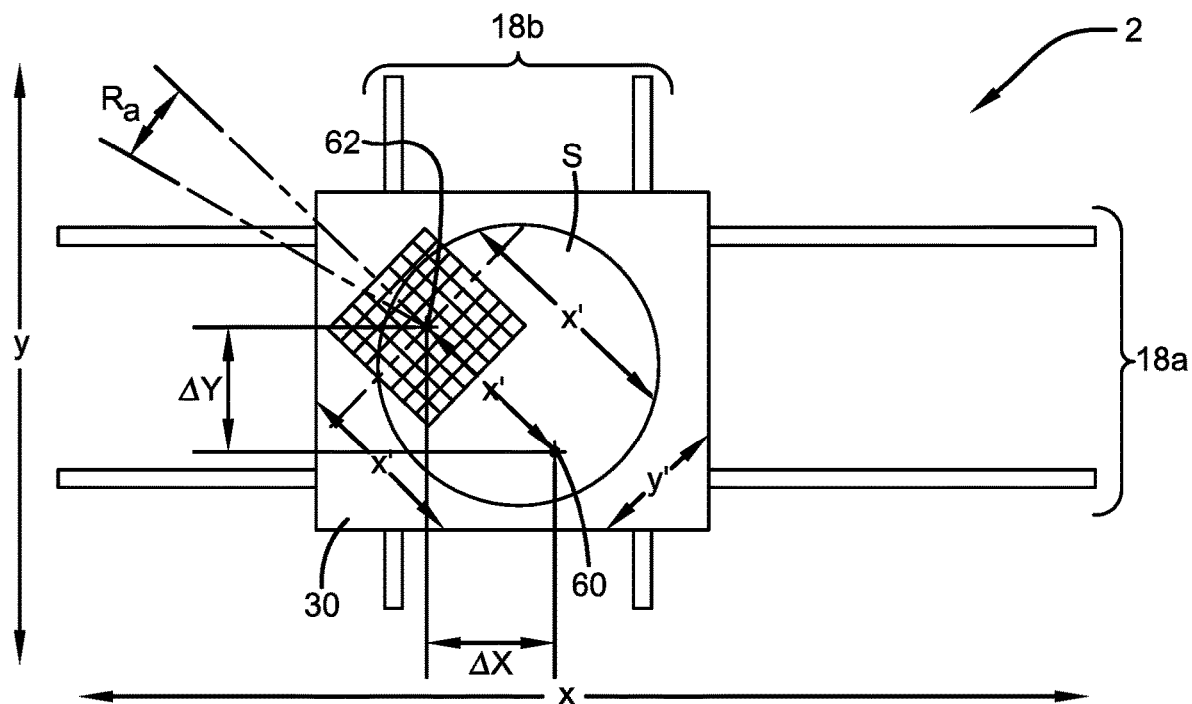
FIG. 7B is a schematic representation of a rotation step wherein the rows of pixels of the image sensor are made to be substantially parallel to the x'-direction.

In the particular method represented in the drawings, and particularly FIG. 7B, the sensor is rotated by rotation Ra so as to align the pixel rows with desired scanning direction x'. In this embodiment, the rotation occurs after the determination of $\Delta X$ and $\Delta Y$, but it will be appreciated that, in other embodiments, the image sensor could first be aligned and then $\Delta X$ and $\Delta Y$ can be determined through the movements described above. Rotation techniques are disclosed herein below.

Figure 11A:
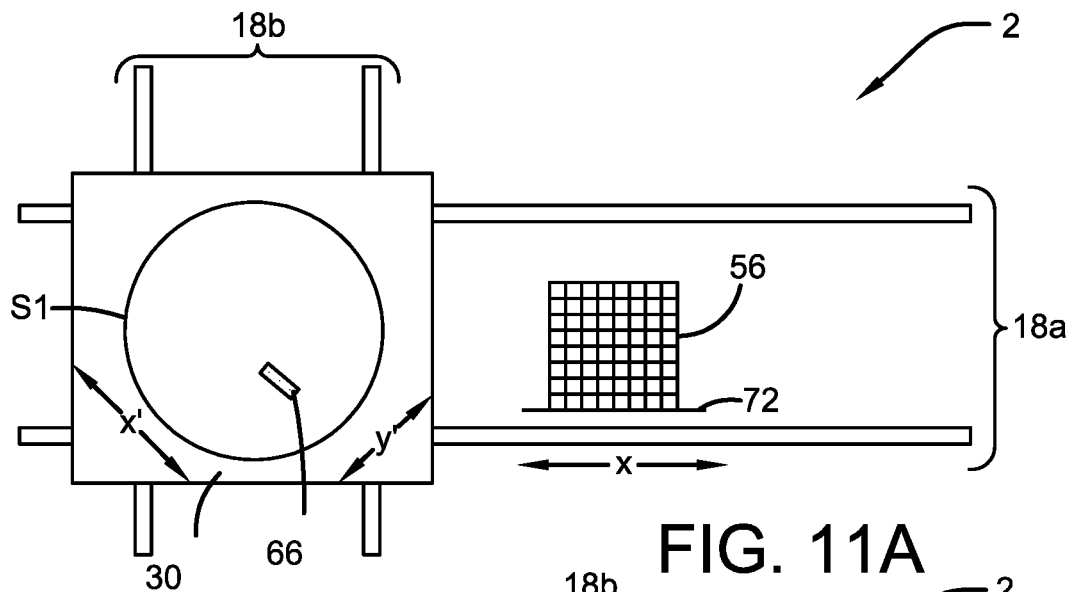
FIGS. 11A, 11B, and 11C, together provide a schematic representation of a method for rotation an image sensor to have pixel rows substantially parallel to an axis-defining feature.
Figure 11B:
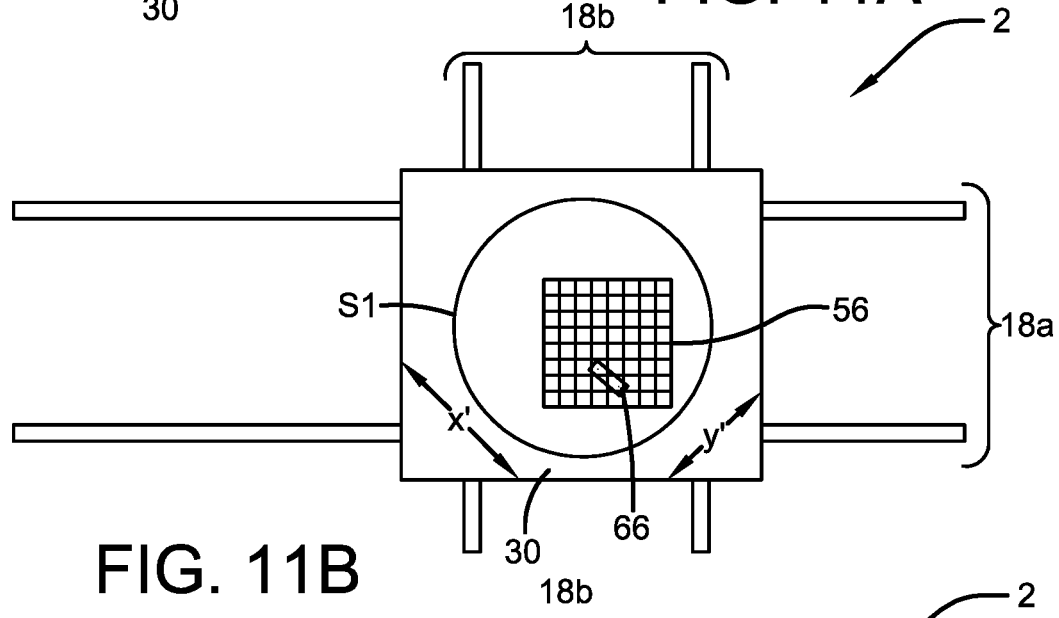
Figure 11C:
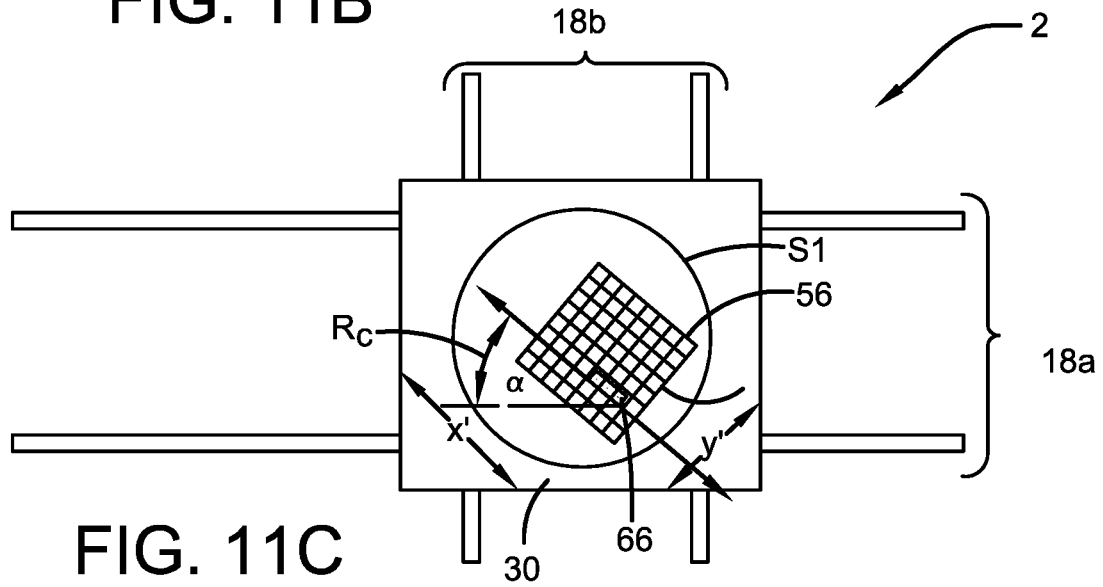

In some embodiments, as generally represented in FIGS. 11A, 11B, and 11C, the rotating of the image sensor includes identifying an axis-defining feature 66 on the specimen S, the axis-defining feature 66 having detectable shape running in a desired x'-direction. The axis-defining feature 66 is so named because it is provided to define the desired scanning direction x'. Computer vision is used to orient the pixel rows parallel to the x'-direction of the specimen based on the detectable shape of the axis-defining feature 66. A rectangular shape is shown as the axis-defining feature 66.

Figure 13:
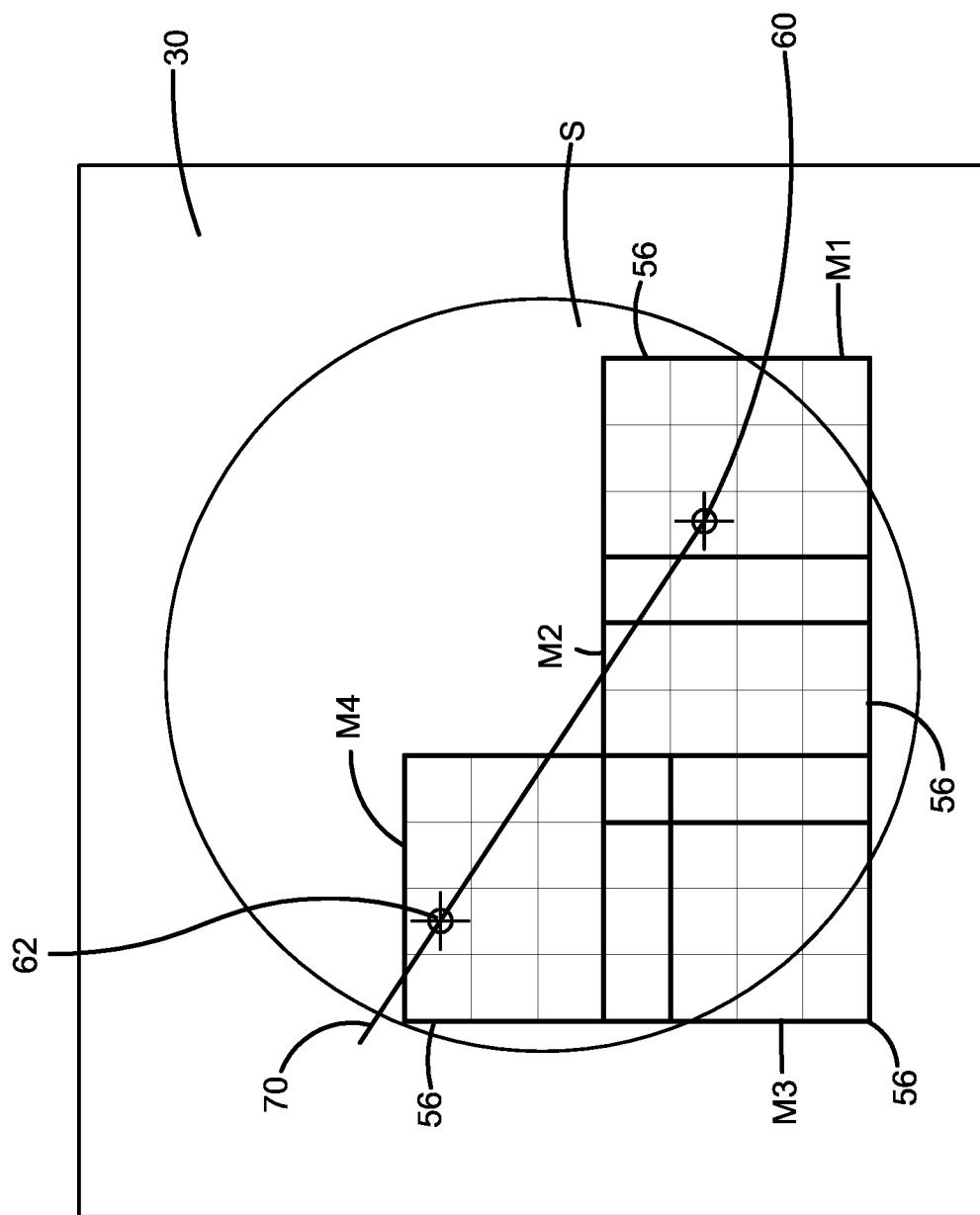
FIG. 13 is a schematic representation of a rotation technique employing a mosaic of images (image data).

Another rotation technique is shown in FIG. 13, and includes forming a mosaic of overlapping images (m1, m2, m3, m4) encompassing both first alignment mark 60 and second alignment mark 62, and using computer vision to calculate a reference line 70 between the two alignment marks (this line also being the desired x'-direction) and align the pixel rows of the image sensor with the reference line 70. In FIG. 13, the specimen has been moved relative to the image sensor 56 to take a plurality of images (m1, m2, m3, m4), and these images (i.e., image data) are capable of being processed by a computer to define the reference line 70 between the alignment mark 60 and the alignment mark 62. With this composite of image data, computer vision is employed to align the pixel rows of the image sensor with the reference line 70 as calculated by the computer (e.g., processor 22).

For example, from the position of image m1, taking into account the position of alignment mark 60, the specimen is moved in the x-direction in incremental distances less than the width of the field of view of the image sensor. Here the distance is 75% of the width (i.e., moved 3 pixels in a total of 4) just for ease of depicting the concept in drawings. However, in some embodiments, these increments (including y increment movements described below) can be between 5 and 50% of the (width or height dimension of the) field of view. In other embodiments, the increments are between 10% and 30% of the field of view, and in other embodiments, between 10 and 20% of the field of view. The specimen is moved at such increments in the x-direction until it has been moved a distance suitable for aligning the image sensor 56 under the alignment mark 62. At each incremental movement an image is taken (e.g., m1, m2, m3, m4). The specimen is then moved in the y-direction until alignment mark 62 is within the field of view of the sensor. An image is taken at each increment (e.g., m5, m6). Using standard image stitching techniques, a composite image is obtained showing alignment marks 60 and 62 in the composite image. Again, with this composite of image data, computer vision is employed to align the pixel rows of the image sensor with the reference line 70.

With the pixel rows aligned (regardless of the method employed to do so) the slope/angle of offset can be employed as noted with respect to FIG. 8 to accurately move/scan alone the x'-direction.

With respect to orienting pixel rows parallel to the desired x'-direction, it will be appreciated that a perfectly parallel relationship is likely theoretical only, especially when considering the potential for working at high magnification (where small angular offsets are more easily appreciated). The present invention seeks to align the pixel rows with the desired x'-direction so that there is extremely low or no degree of offset between the x'-direction of the specimen and the direction the pixel rows extend. This is similar to the concerns of "orthogonality error" described above with respect to XY translation stages. In some embodiments, it is sufficient herein that the pixel rows be less than 0.002 degrees off of the desired x'-direction. In some embodiments, the pixel rows are less than 0.0015 degrees off of the desired x'-direction, in other embodiments, less than 0.001 degrees, in other embodiments, less than 0.0005 degrees, in other embodiments, less than 0.00025 degrees, in other embodiments, less than 0.0002 degrees, in other embodiments, less than 0.00015 degrees, in other embodiments, less than 0.0001 degree, and, in other embodiments, less than 0.00005 degrees. In sum, the recitations herein regarding alignment do not require absolute perfect alignment, but rather a substantial alignment (or substantially parallel relationship) suitable for the purpose for which the present invention is provided. In some embodiments, the invention serves to substantially reduce orthogonality error evident at high magnifications, even on the order of 100× or higher. In particular, the present invention provides a highly accurate alignment suitable for scanning along a desired x'-direction without a significant shift in the y'-direction, even at high levels of magnification.

Figure 9A:
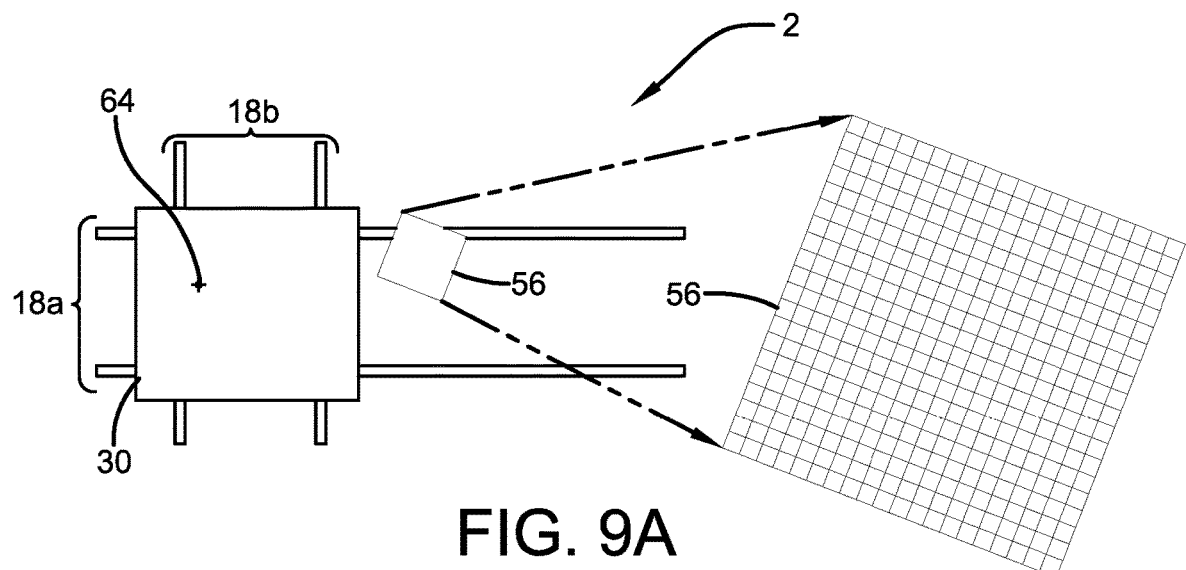
FIG. 9A is a schematic representation of a reference mark 64 on a specimen chuck 30 on an XY translation stage (18a, 18b), with an image sensor 56, showing the general conditions for application of an embodiment of the present invention for aligning the pixel rows of an image sensor with the x-direction of the XY translation stage.

A second embodiment of the invention is shown in FIGS. 9-11, and relates first to a method of aligning the image sensor 56 with the translation stage 18 so that the pixel rows are substantially parallel to the x-direction. A first step of this embodiment thus requires the sensor 56 be aligned with the movement of the translation stage 18 (i.e., pixel rows and columns parallel to the x-direction travel and the y-direction travel). FIG. 9A shows the translation stage with the specimen chuck 30 at a position left of the image sensor 56. In some embodiments, the specimen chuck 30*a* has a reference mark 64 imprinted thereon provided to be viewed and located by computer vision. In other embodiments, a specimen S placed on the specimen chuck 30*a* has a reference mark thereon, such that this method envisions either the specimen chuck or a specimen placed thereon including a reference mark, but the method is specifically disclosed with respect to images showing the reference mark 64 on the specimen chuck 30*a*. When implementing this method with a reference mark on a specimen placed on the specimen chuck, the relative positions between the chuck and the specimen should not be allowed to change during movement of the specimen chuck.

Figure 9B:
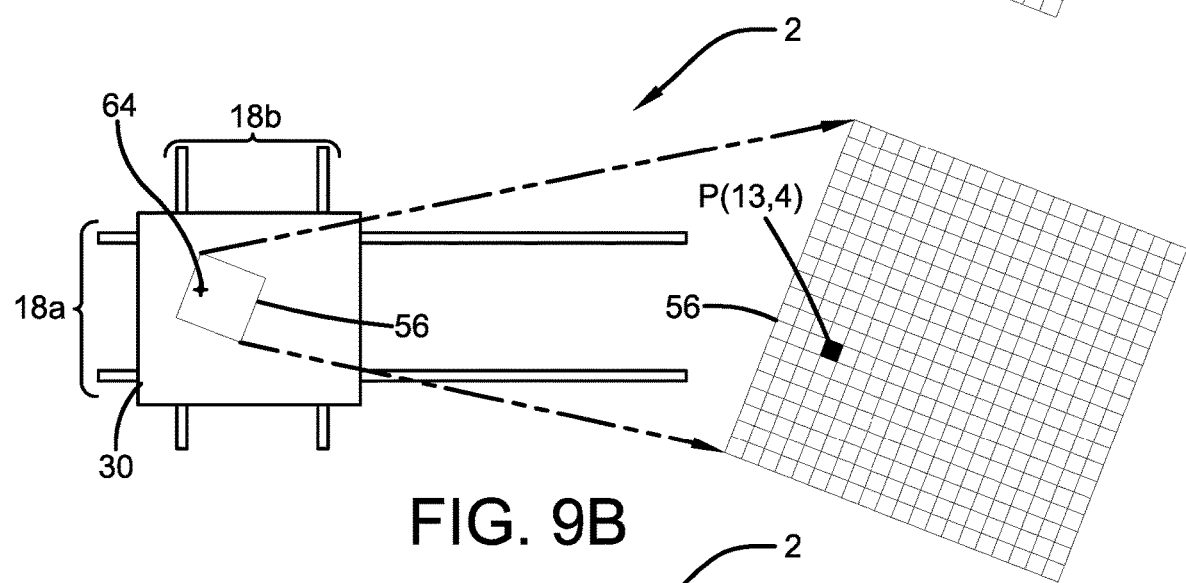
FIG. 9B is a schematic representation of a first step in aligning the pixel rows from the general starting conditions of FIG. 5.
Figure 9C:
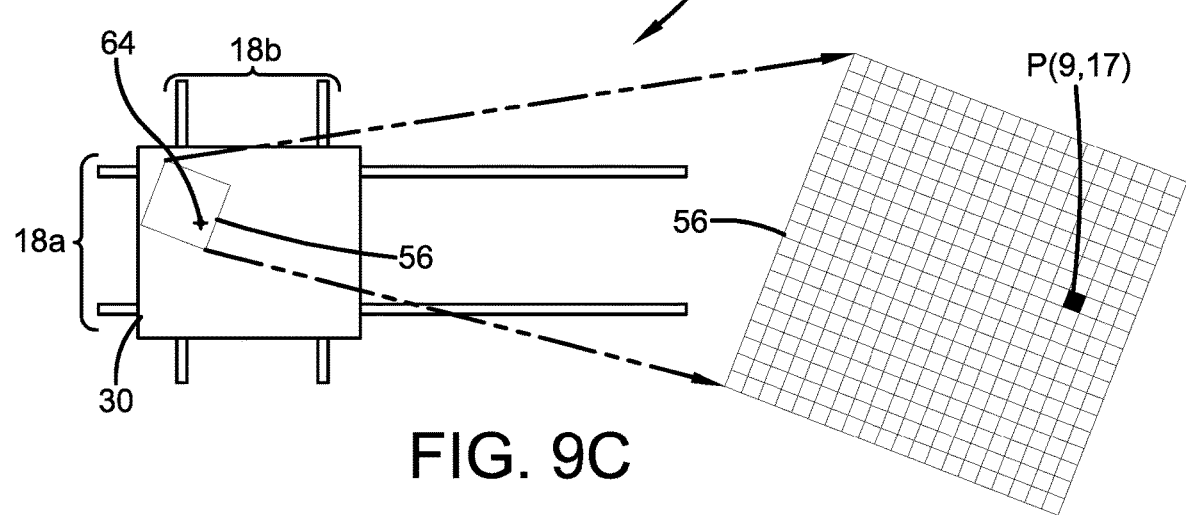
FIG. 9C is a schematic representation of a second step in aligning the pixel rows from the general starting conditions of FIG. 5.

Per FIG. 9B, the specimen chuck 30 is moved in the x-direction until reference mark 64 is in the field of view of the image sensor 56. As noted previously, each pixel has a unique location designated by P(j,i). In FIG. 9B that mark 64 has been imaged and, for the purpose of example, is located in P(13,4). As seen in FIG. 9C, the specimen chuck 30 is moved in the x-direction by the XY translation stage 18 so that reference mark 64 is laterally moved (x-direction) relative to the image sensor 56 but still in the image sensor field of view. The reference mark 64 is now position in pixel P(9,17). It should be noted that the example shown is not to actual scale. Image sensors can have 1,000s of rows of pixels and 1,000s of columns of pixels.

Figure 10A:
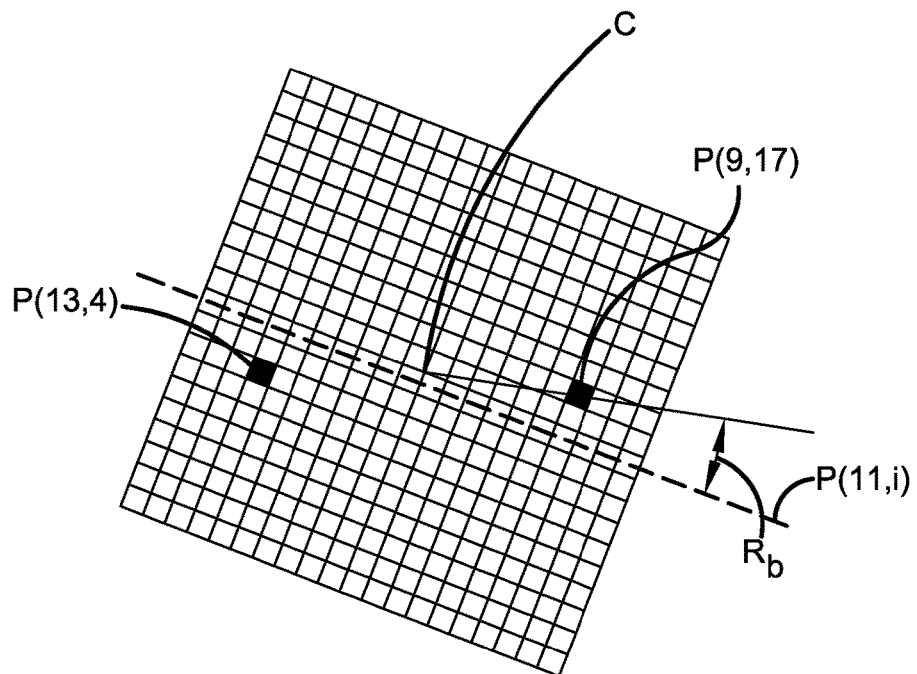
FIGS. 10A and 10B together provide a schematic representation of a method for iteratively rotating an image sensor to align its pixel rows with the x-direction of the XY translation stage.
Figure 10B:
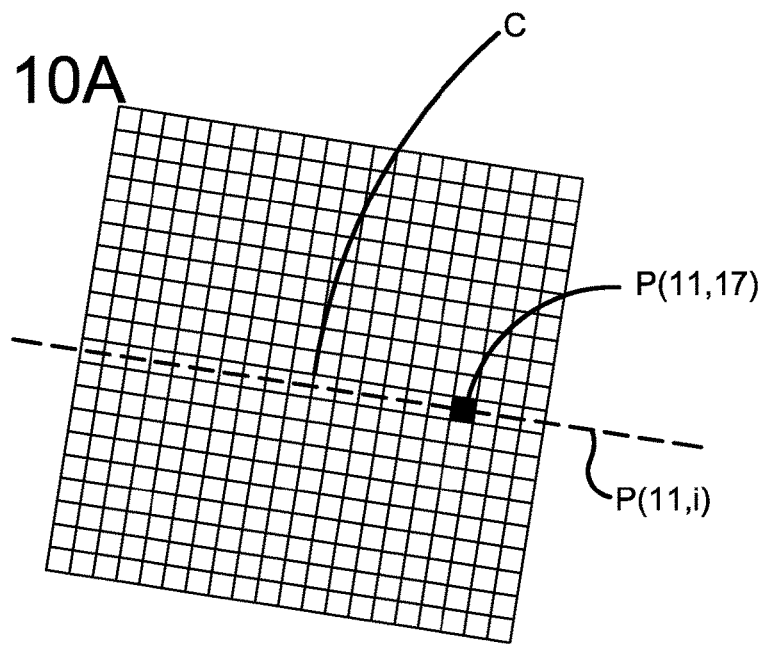

After this first lateral movement and imaging, the goal is to rotate the camera so that when the image sensor 56 scans across the field of view of the specimen chuck 30, the reference mark 64 is imaged in the same pixel row or rows as it passes across the sensor, i.e., there is no substantial change in relative positions in the y-direction. FIG. 10A shows the image sensor 56 and the relative locations of the reference mark 64 in the image of FIG. 9B (mark at P(13,4)) and the image of FIG. 9C (mark at P(9,17)). Center lines shows the x- and y-direction of movement of the specimen chuck 30 (as defined by the translation stage 18). With the image sensor 56 oriented as in FIGS. 9A-9C, there is a very large y-direction shift during relative movement of the image sensor 56 and the specimen chuck 30, and this shift can be reduced and effectively eliminated by a method involving averaging row numbers of the reference mark 64 at the two positions. In this example, the reference mark 64 is in row 13 in the image of FIG. 9B, and in row 9 in the image of FIG. 9C. A line which represents the average (i.e., (9+13)÷2=11) is shown across row 11 in FIGS. 10*a* and 10*b*. Assuming that the specimen chuck 30 is still in the second position as indicated in FIGS. 9C, the camera 8 and image sensor 56 is rotated by camera rotator 8 by rotation Rb (see FIG. 10A) so the reference mark 64 is in row 11. As seen in FIG. 10B, this step places the rows of pixels in the image sensor 56 closer to parallel with the x-direction of the specimen chuck 30. These steps of imaging the mark across the image sensor at two locations and then rotating the camera is repeated until the desired substantial alignment is reached between the pixel rows of the image sensor and the x-direction of the translation stage. In some embodiments, the steps are repeated until the center of the reference mark 64 (as determined by computer vision) remains in a single row of pixels when scanned across the entire width of the image sensor 56. Notably, averaging row numbers of the reference mark 64 at the two positions is only one way to iteratively arrive at a highly precise alignment. It is sufficient in other embodiments, that the rotation represented by Rb simply place the reference mark 64 in a row number between the two row numbers for the reference mark upon movement of the image sensor between the two positions.

In some embodiments, the reference mark 64 is smaller than a pixel, and is thus targeted on a single pixel to perform this alignment process. In other embodiments, the reference mark 64 encompasses multiple pixels. In some embodiments, the reference mark 64 encompasses multiple pixels, and the center of the reference mark 64 is calculated and used for positioning in a target pixel (such as the center C used in the example). The center can be calculated through computer vision.

In some embodiments, the reference mark 64 is positioned close to the edge of the field of view, but still within the field of view of the image sensor, in each placement. This provides a more accurate assessment because it employs a longer x-direction travel by which to assess the y-direction shift. For example, per the figures, the reference mark 64 is positioned so that, in the image shown in FIG. 9B, the mark is positioned to the left of center close to the edge of the field of view but still within the field of view, while the reference mark 64 is then re-positioned so that, in FIG. 9C, the reference mark 64 is positioned to the right of center close to the edge of the field of view but still within the field of view.

After aligning the image sensor 56 to the x movement of the specimen chuck 30, the image sensor 56 is rotated to align image sensor 56 with a desired x'-direction for scanning across the specimen. In this embodiment specimen S1 represents a specimen that with axis-defining feature 66 imprinted on it with distinct axis-defining characteristics which define the desired x'- and/or y'-directions for scanning across the specimen S1. FIG. 11A shows the specimen S1 place on specimen chuck 30 prior to scanning, and line 72 is provided to visually represent that the image sensor 56 is aligned with the x and y travel of the specimen chuck 30. As seen in FIG. 11B, the specimen chuck 30 is moved so that feature 66 is within the field of view of the sensor 56. In FIG.

11C the image sensor 56 is rotate by a measured number of degrees, Rc, which is also α, so as to align the pixel rows of the image sensor with the x'-direction defined by feature 66. As already noted, the image sensor rotation can be precisely known by rotary encoders, potentiometer, stepper motor control or other, such that the angular rotation α is known.

Alternatively, after aligning the image sensor 56 to the x movement of the specimen chuck 30, alignment marks and a mosaic may be employed to identify the desired x'-direction and rotate the image sensor (as in FIG. 13).

Notably, because the reference mark 64 is associated with the XY translation stage, the aligning of the pixel rows of the image sensor with the x-direction of the XY translation stage needs only be performed once, and the aligned position can be recorded for future use. Thus, a different specimen can be placed on the chuck with a different orientation and different axis-defining feature, and the image sensor can be positioned with pixel rows aligned to the x-direction (per the process above) and then rotated to the axis-defining feature to find the angle of offset of desired x'-direction of the new specimen.

Starting with the image sensor pixel rows aligned with the x-direction of the XY stage, the subsequent angular rotation of the camera Rc (to place the pixel rows in the desired x'-direction) is equivalent to a described with respect to FIG. 8, and any movement d' in a desired x'-direction can now be determined by: $\Delta X=d'(\cos(\alpha))$; $\Delta Y=d'(\sin(\alpha))$.

Figure 12:
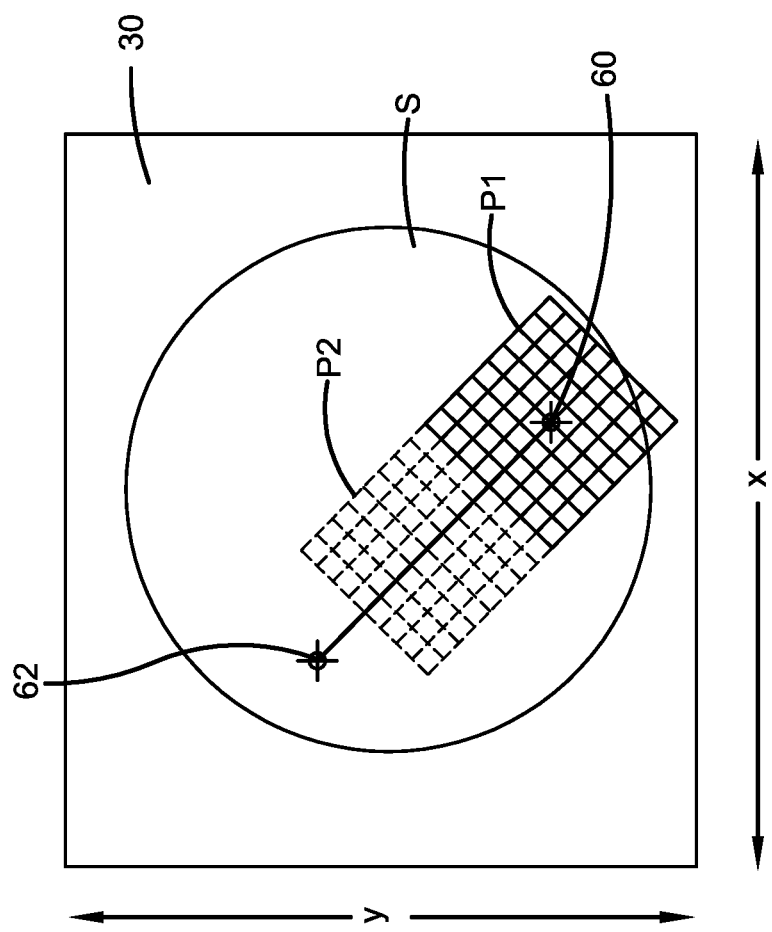
FIG. 12 is a schematic representation of an image stitching technique in accordance with this invention.

Regardless of the methods herein employed to align the pixel rows with a desired x'-direction and to determine the slope/angle of offset of that x'-direction relative to the x-direction of the XY translation stage, once the pixels are so aligned and the slope/angle is determined, the specimen S can be moved in such a manner that a left border of a first image can be accurately stitched to a right border of a second image, where "left" and "right" are defined in the x'-direction. For example, in FIG. 12, a first imaging position is shown by the positioning of image sensor 14 at p1 and a second imaging position is shown by the positioning of image sensor 14 at p2, wherein the left border of imaging sensor 14 at p1 is aligned with the right border of image sensor 14 at p2, again without any significant shifting in the y' direction. It should also be appreciated that it is acceptable to take images p1 and p2 with an overlapping region, i.e., where columns of pixels at the left side of the image at p1 overlap with columns of pixels at the right side of the image at p2. The overlapping portions can assist in the accurate stitching, as known. The present invention, however, by causing an alignment of pixel rows with the desired x'-direction, facilitates an accurate border-to-border stitching of images, which can decrease the entire imaging process by requiring less images and less computation.

It should be appreciated that the various steps herein can, and preferably are performed automatically by the microscope system 10. The movement of moveable and rotatable components would be handled by appropriate software and hardware, and computer vision can be employed to identify detectable features such as the alignment marks 60, 62, the reference mark 64, and the axis-defining features 66 that govern the orientation of the image sensor 56 relative to the specimen. The focusing and taking of image data can also be automated. This all is represented in the figures by processor 22. Thus, the present invention allows the specimen and XY translation stage to be out of alignment (i.e., desired x'- and y'-directions of the specimen are out of alignment with the x- and y-directions of the translation stage) and does not require manipulation of the specimen to remedy this lack of alignment. The system self-calibrates, and, knowing the width of an image sensor, can progressively scan the specimen and take discreet images having aligned borders to then be stitched together to form the complete desired image of the specimen.

The general concepts of the present invention are adequately disclosed to those of ordinary skill in the art by the figures and description herein. The detailed disclosure is provided to broadly disclose those general concepts, but is not necessary for those of ordinary skill in the art to fully implement the concepts of the present invention. This is true even though the drawings are schematic.

Before concluding it should be noted that focusing on the x-direction is this disclosure is in no way limiting, in that x and y-directions are simply based on orientations, and the present invention is employed in the same manner to attend to scanning in a desired y'-direction. Thus references to x and y are purely for purposes of having directional reference.

While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method for imaging a specimen along a desired x'-direction of the specimen, the method comprising:
    rotating an image sensor such that pixel rows of the image sensor are substantially parallel with the desired x'-direction of the specimen, the desired x'-direction of the specimen being angularly offset from an x direction of an XY translation stage on which the specimen is positioned, wherein the XY translation stage is movable in an x direction and a y direction relative to the image sensor;
    determining the angle of offset of the desired x'-direction as compared to the x-direction of the XY translation stage; and
    moving the specimen, using the XY translation stage, to one or more positions, along the desired x' direction.

2. The method of claim 1, wherein the determining the angle of offset comprises:
    measuring, relative to the x-direction and y-direction of the XY translation stage, an x distance and y distance between a first focal feature and a second focal feature on the specimen aligned along and defining the desired x'-direction.

3. The method of claim 2, wherein the measuring the x distance and y distance comprises:
    placing the first focal feature so as to overlap with one or more target pixels of the image sensor,
    moving the specimen to place the second focal feature so as to overlap with the same one or more target pixels, and
    determining the x distance and y distance by measuring the magnitude of x and y movement of the translation stage ($\Delta X$, $\Delta Y$) necessary to achieve the moving the specimen to place the second focal feature so as to overlap with the same one or more target pixels.

4. The method of claim 3, wherein the target pixels encompass the center of the image sensor.

5. The method of claim 3, wherein the rotating the image sensor comprises identifying an axis-defining feature on the specimen running in the x'-direction, and using computer vision to align the pixel rows substantially parallel to the axis-defining feature.

6. The method of claim 5, wherein the rotating the image sensor is performed before measuring the x distance and y distance.

7. The method of claim 1, wherein the rotating the image sensor comprises taking a mosaic of images suitable for calculating a reference line between a first focal feature and a second focal feature on the specimen aligned along and defining the desired x'-direction; and using computer vision to align the pixel rows of the image sensor with the reference line.

8. The method of claim 7, wherein the determining the angle of offset comprises:

measuring, relative to the x-direction and y-directions of the XY translation stage, an x distance and y distance between the first focal feature and the second focal feature, and taking the mosaic of images while measuring the x distance and y distance.

9. The method of claim 1, further comprising aligning the pixel rows of the image sensor substantially parallel to the x-direction of the XY translation stage, before rotating the image sensor.

10. The method of claim 9, wherein the rotating the image sensor comprises:

identifying an axis-defining feature on the specimen, the axis-defining feature having a detectable shape running in the desired x'-direction; and using computer vision to align the pixel rows substantially parallel to the detectable shape, and wherein the determining the angle of offset includes:

measuring the degrees of rotation of the pixel rows of the image sensor from a position substantially parallel to the x-direction of the XY translation stage to a position substantially parallel to the detectable shape of the axis-defining feature.

11. A microscope system comprising:

a microscope;

an image sensor comprising pixel rows and pixel columns that is configured to record image data;

an XY translation stage that is movable in an X direction and a Y direction;

a processor configured to:

rotate the image sensor relative to a specimen such that the pixel rows are substantially parallel with an x'-direction of the specimen placed on the XY translation stage, wherein the x' direction is angularly offset from the X direction of the XY translation stage, move the XY translation stage;

determine the angle of offset of the x'-direction as compared to the x-direction of the XY translation stage; and scan across the specimen in the x' direction.

12. The microscope system of claim 11, wherein the processor is further configured to determine, relative to the x-direction and y-direction of the translation stage, the angle of offset by measuring an x distance and y distance between a first focal feature and a second focal feature on the specimen aligned along and thus defining the desired x'-direction.

13. The microscope system of claim 12, wherein measuring the x distance and y distance comprises:

placing the first focal feature so as to overlap with one or more target pixels of the image sensor;

moving the specimen to place the second focal feature so as to overlap with the same one or more target pixels; and determining the x distance and y distance by measuring the magnitude of x and y movement of the translation stage ($\Delta X$, $\Delta Y$) necessary to achieve the moving the specimen to place the second focal feature so as to overlap with the one or more target pixels.

14. The microscope system of claim 13, wherein the target pixels encompass the center of the image sensor.

15. The microscope system of claim 13, wherein the rotating the image sensor comprises: identifying an axis-defining feature on the specimen running in the x'-direction; and using computer vision to align the pixel rows substantially parallel to the axis-defining feature.

16. The microscope system of claim 15, wherein rotating the image sensor is performed before measuring the x distance and y distance.

17. The microscope system of claim 11, wherein the rotating the image sensor comprises:

taking a mosaic of images suitable for calculating a reference line between a first focal feature and a second focal feature on the specimen aligned along and defining the desired x'-direction; and using computer vision to align the pixel rows of the image sensor with the reference line.

18. The microscope system of claim 17, wherein the taking a mosaic of images is performed while measuring the x distance and y distance.

19. The microscope system of claim 11, wherein, before the rotating the image sensor, the processor is configured to align the pixel rows of the image sensor substantially parallel to the x-direction of the XY translation stage.

20. The microscope system of claim 19, wherein the rotating the image sensor includes:

identifying an axis-defining feature on the specimen, the axis-defining feature having a detectable shape running in the desired x'-direction; and using computer vision to align the pixel rows substantially parallel to the detectable shape, and wherein the determining the angle of offset includes:

measuring the degrees of rotation of the pixel rows of the image sensor from a position substantially parallel to the x-direction of the XY translation stage to a position substantially parallel to the detectable shape of the axis defining feature.

* * * * *